(12) United States Patent
Lu

(10) Patent No.: US 7,143,424 B2
(45) Date of Patent: Nov. 28, 2006

(54) MULTI-MEDIA PLAYER HAVING A ROTATABLE PANEL

(75) Inventor: Kun-Feng Lu, Sindian (TW)

(73) Assignee: Giga-Byte Technology Co., Ltd., Taipei County (TW)

( * ) Notice: Subject to any disclaimer, the term of this patent is extended or adjusted under 35 U.S.C. 154(b) by 410 days.

(21) Appl. No.: 10/756,333

(22) Filed: Jan. 14, 2004

(65) Prior Publication Data

US 2004/0223724 A1   Nov. 11, 2004

(30) Foreign Application Priority Data

May 9, 2003    (TW) .............................. 92208559 U

(51) Int. Cl.
*G11B 33/02*    (2006.01)
(52) U.S. Cl. ..................................... 720/647
(58) Field of Classification Search ..................... None
See application file for complete search history.

(56) References Cited

U.S. PATENT DOCUMENTS

| | | | | |
|---|---|---|---|---|
| 5,177,730 A | * | 1/1993 | Utsugi ......................... | 720/646 |
| 5,848,042 A | * | 12/1998 | Takahashi et al. .......... | 720/647 |
| 5,953,302 A | * | 9/1999 | Kobayashi .................. | 720/647 |
| 6,398,168 B1 | * | 6/2002 | O Tae ......................... | 248/27.3 |
| 2003/0193871 A1 | * | 10/2003 | Tobishima et al. .......... | 369/75.1 |

FOREIGN PATENT DOCUMENTS

JP             359201282 A    * 11/1984

* cited by examiner

*Primary Examiner*—Allen Cao
(74) *Attorney, Agent, or Firm*—Rosenberg, Klein & Lee

(57) ABSTRACT

A multi-media player includes a main frame, and a rotatable panel. The rotatable panel includes a mounting plate and a casing. The casing is rotatable between a first position where the back plate of the casing is rested on the front face of the mounting plate and a second position where the back plate is removed from the front face of the mounting plate to expose the window of the mounting plate. The front plate is provided with an indicator to indicate an operation condition of the multi-media player and a plurality of control switches to control an operation of the multi-media player.

10 Claims, 6 Drawing Sheets

US 7,143,424 B2

MULTI-MEDIA PLAYER HAVING A ROTATABLE PANEL

BACKGROUND OF THE INVENTION

1. Field of the Invention

The present invention relates to a multi-media player, and more particularly to a multi-media player having a rotatable panel that forms an operation panel that can indicate the operation condition of the multi-media player and can also control the playing functions of the multi-media player.

2. Description of the Related Art

A conventional multi-media player, such as a VCD or DVD player, mounted on the computer comprises a main frame, a retractable tray movably mounted in the main frame for carrying a portable storage medium, such as a VCD or DVD, and a cover plate that is pivoted relative to the main frame to cover or open the retractable tray. However, the cover plate is only used to cover or open the retractable tray without having other additional functions, thereby limiting the versatility of the cover plate. In addition, the cover plate is not operated easily, thereby causing inconvenience to the user.

SUMMARY OF THE INVENTION

The present invention is to mitigate and/or obviate the disadvantage of the conventional multi-media player.

The primary objective of the present invention is to provide a multi-media player having a rotatable panel.

Another objective of the present invention is to provide a multi-media player, wherein the rotatable panel forms an operation panel that can indicate the operation condition of the multi-media player and can also control the playing functions of the multi-media player.

A further objective of the present invention is to provide a multi-media player, wherein the rotatable panel has a rotatable function to cover or detach from the receiving portion of the main frame.

In accordance with the present invention, there is provided a multi-media player, comprising:

a main frame; and a rotatable panel rotatably mounted on the main frame and including:

a mounting plate secured on the main frame and formed with a window, the mounting plate having a front face; and a casing rotatably mounted on the mounting plate and including a front plate and a back plate combined with each other, wherein:

the casing is rotatable between a first position where the back plate of the casing is rested on the front face of the mounting plate and a second position where the back plate of the casing is removed from the front face of the mounting plate to expose the window;

the front plate of the casing is provided with an indicator to indicate an operation condition of the multi-media player and a plurality of control switches to control an operation of the multi-media player.

Further benefits and advantages of the present invention will become apparent after a careful reading of the detailed description with appropriate reference to the accompanying drawings.

DETAILED DESCRIPTION OF THE INVENTION

Figure 1:
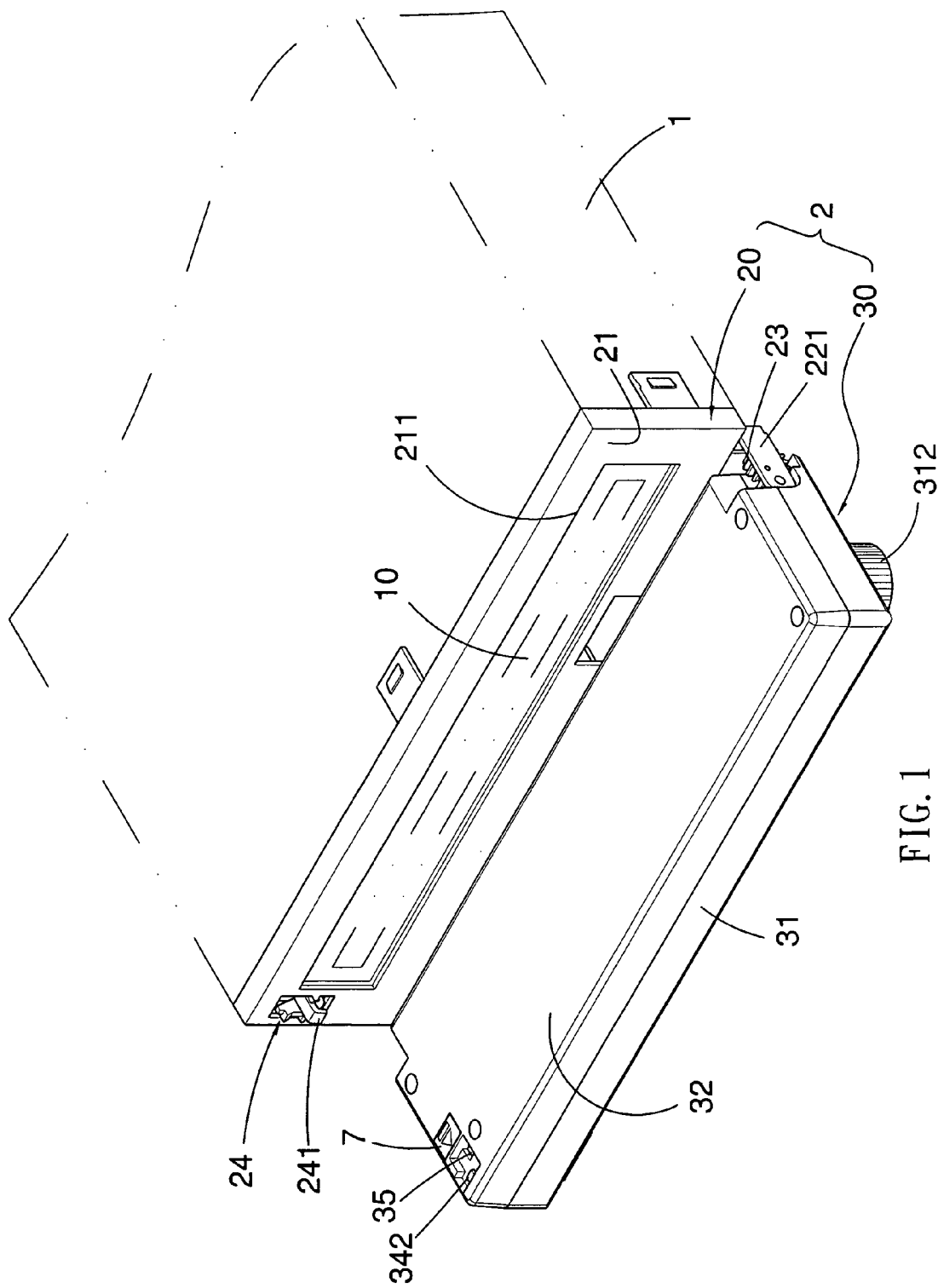
FIG. 1 is a partially cut-away perspective view of a multi-media player in accordance with the preferred embodiment of the present invention.

Referring to the drawings and initially to FIGS. 1–5, a multi-media player, such as a VCD or DVD player, in accordance with the preferred embodiment of the present invention comprises a main frame 1, and a rotatable panel 2 rotatably mounted on the main frame 1.

The main frame 1 is provided with a receiving portion 10 for carrying a portable storage medium, such as a VCD or DVD. Preferably, the receiving portion 10 of the main frame 1 is a retractable tray.

The rotatable panel 2 includes a mounting plate 20 secured on the main frame 1, and a casing 30 rotatably mounted on the mounting plate 20.

Figure 4:
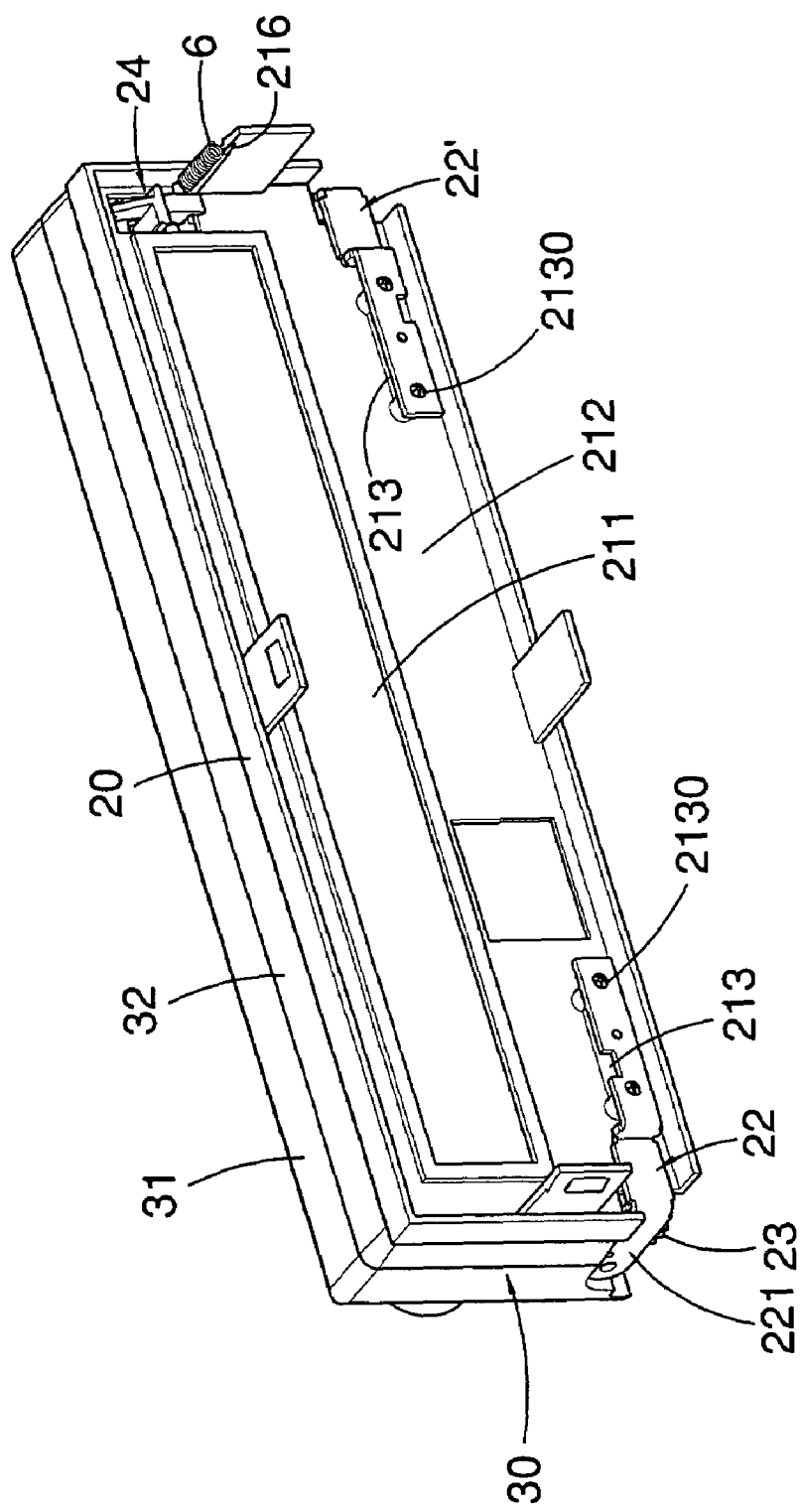
FIG. 4 is a bottom perspective view of the multi-media player in accordance with the preferred embodiment of the present invention.

The mounting plate 20 has a front face 21 and a back face 212 (see FIG. 4). The mounting plate 20 is formed with a window 211 aligning with the receiving portion 10 of the main frame 1 for passage of the receiving portion 10 of the main frame 1.

The casing 30 includes a front plate 31 and a back plate 32 combined with each other. The front plate 31 is preferably provided with an indicator 311 and two control switches 312. The indicator 311 is preferably a liquid crystal display (LCD) to indicate the operation condition of the multi-media player. The two control switches 312 are preferably a volume control button and a frequency modulation button to control the playing functions of the multi-media player.

Figure 2:
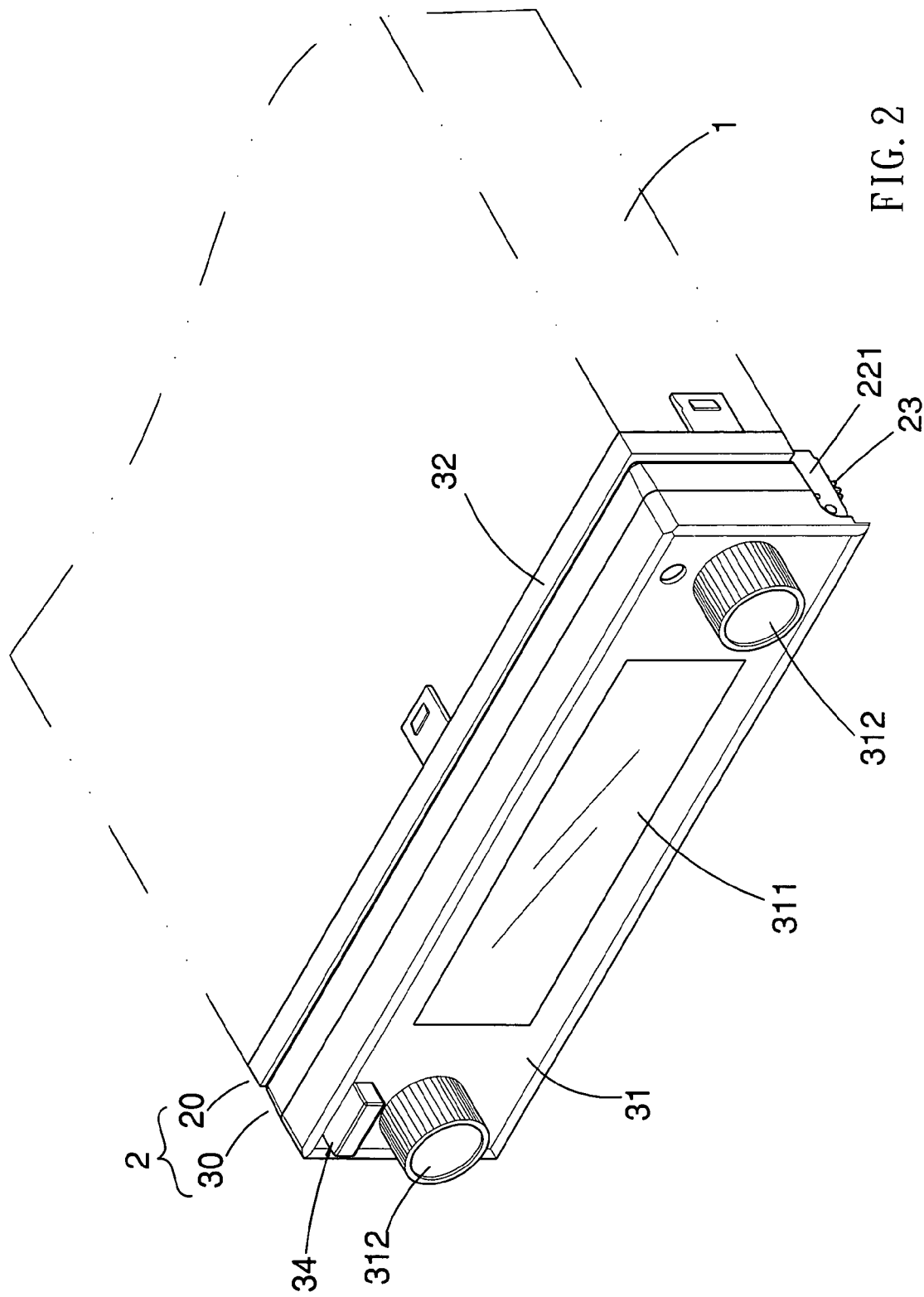
FIG. 2 is a partially cut-away perspective view of the multi-media player in accordance with the preferred embodiment of the present invention.
Figure 3:
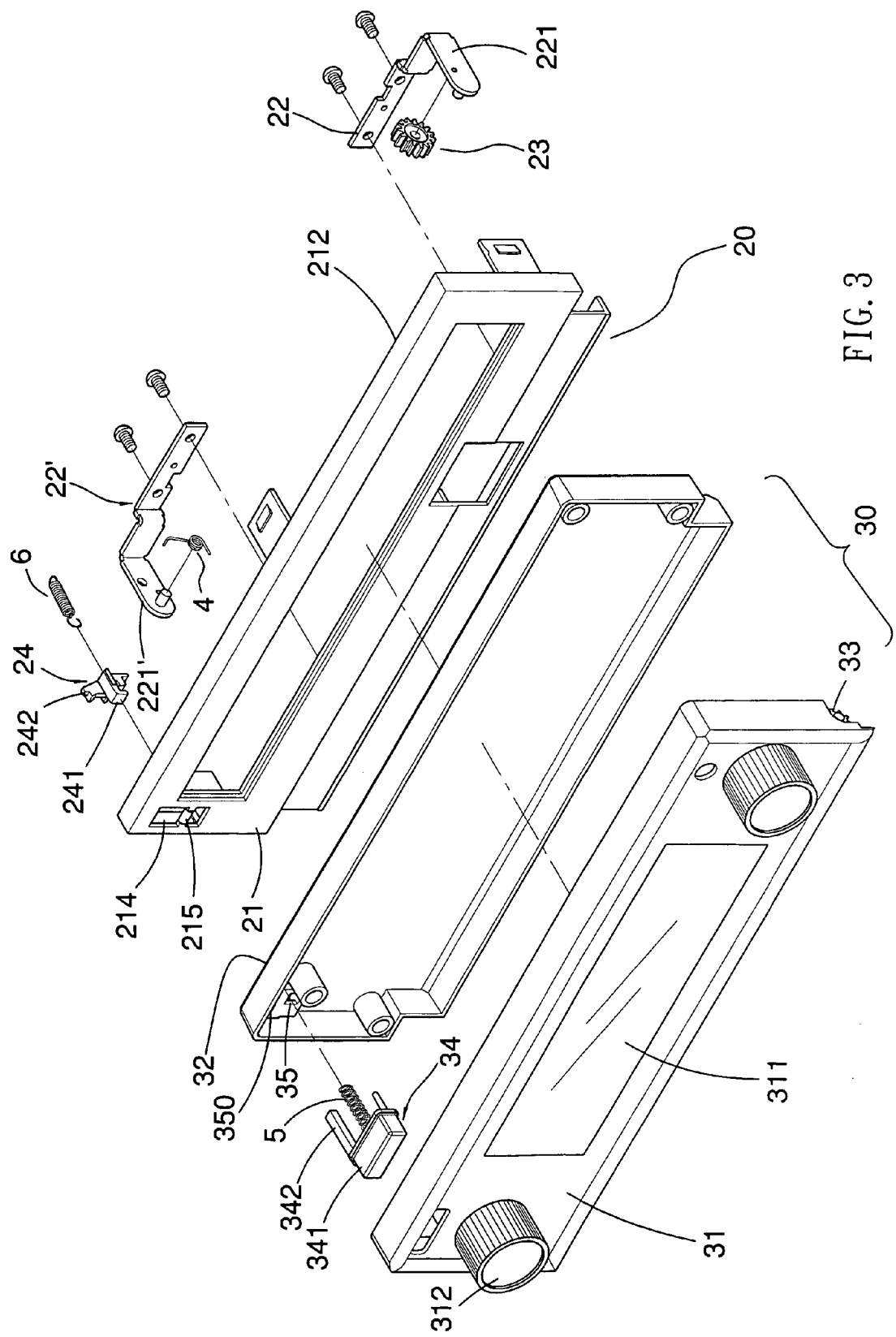
FIG. 3 is an exploded perspective view of the multi-media player as shown in FIG. 2.

The casing 30 is rotatable between a first position where the back plate 32 of the casing 30 is rested on the front face 21 of the mounting plate 20 rigidly and stably as shown in FIG. 2 and a second position where the back plate 32 of the casing 30 is removed from the front face 21 of the mounting plate 20 to wholly expose the window 211 as shown in FIG. 1.

In brief, the casing 30 forms an operation panel that can indicate the operation condition of the multi-media player and can also control the playing functions of the multi-media player. In addition, the casing 30 has a rotatable function to cover or detach from the receiving portion 10 of the main frame 1.

The back face 212 of the mounting plate 20 has a side provided with two opposite combination portions 213 for mounting a substantially L-shaped first crank arm 22 and a substantially L-shaped second crank arm 22' by a plurality of locking screws 2130.

The first crank arm 22 has an extension 221 extended into the casing 30 for rotatably mounting the casing 30. A first gear 23 is rotatably mounted on the extension 221 of the first crank arm 22. A second gear 33 (see FIG. 3) is secured on the front plate 31 of the casing 30 and meshes with the first gear 23.

The second crank arm 22' has an extension 221' extended into the casing 30 for rotatably mounting the casing 30. A torsion spring 4 is pivotally mounted on the extension 221' of the second crank arm 22' and has a first end secured on the extension 221' of the second crank arm 22' and a second end secured on the casing 30.

The back plate 32 of the casing 30 is formed with a snapping hole 35 and a passage hole 350. The front face 21 of the mounting plate 20 is formed with a slot 214. A shaft 215 is mounted in the slot 214 of the mounting plate 20. A hook member 24 is pivotally mounted on the shaft 215 and is movable into the snapping hole 35 of the back plate 32 to lock the back plate 32 of the casing 30. The hook member 24 has an inside formed with a shaft hole 243 (see FIG. 5) pivotally mounted on the shaft 215. The shaft hole 243 of the hook member 24 has a side formed with an opening 244 (see FIG. 5) to facilitate insertion of the shaft 215 into the shaft hole 243 of the hook member 24.

The hook member 24 is provided with a snapping hook 241 that is inserted into the snapping hole 35 of the back plate 32 to lock the back plate 32 of the casing 30 on the mounting plate 20. The hook member 24 has a first end formed with an operation portion 242. A fixing rod 216 is mounted on and protruded outward from the back face 212 of the mounting plate 20. A tensile spring 6 is mounted between the hook member 24 and the mounting plate 20 and has a first end secured on a second end of the hook member 24 and a second end secured on the fixing rod 216.

A first push button 34 is movably mounted on the front plate 31 of the casing 30 and includes a main body 341 protruded outward from the front plate 31 of the casing 30, a drive bar 342 having a first end mounted on the main body 341 and a second end extended through the passage hole 350 of the back plate 32 and rested on the operation portion 242 of the hook member 24 to pivot the hook member 24, and a compression spring 5 mounted between the main body 341 and the back plate 32 of the casing 30.

Figure 5:
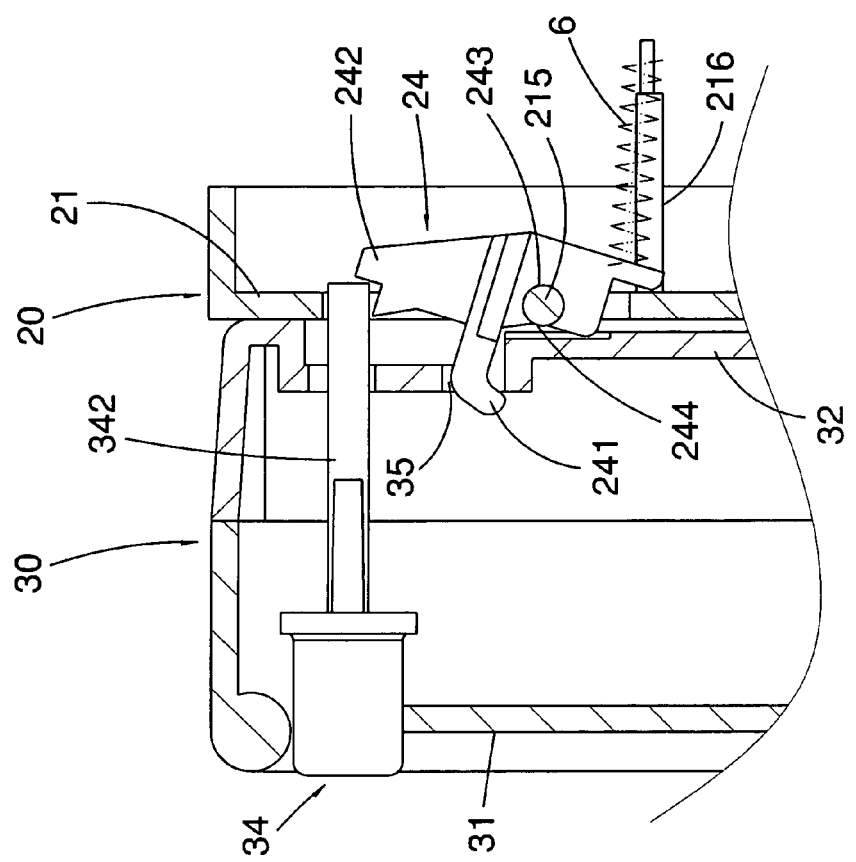
FIG. 5 is a side plan cross-sectional view of the multi-media player as shown in FIG. 2.
Figures 7, 8:
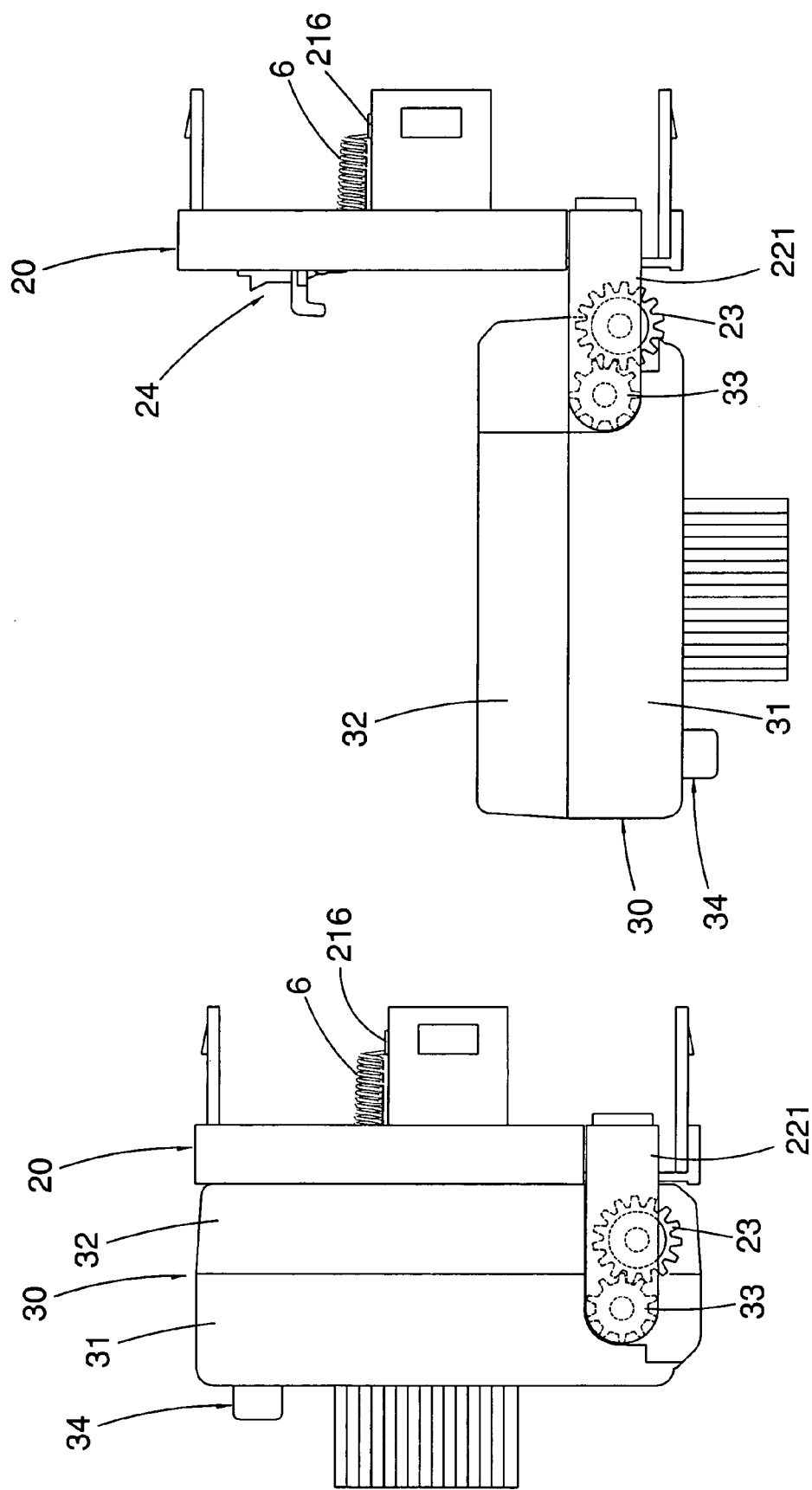
FIG. 7 is a side plan enlarged view of the multi-media player as shown in FIG. 2.
FIG. 8 is a schematic operational view of the multi-media player as shown in FIG. 7.

Referring to FIGS. 1, 2, 5 and 7, when the casing 30 is moved the first position as shown in FIG. 2, the snapping hook 241 of the hook member 24 is inserted into the snapping hole 35 of the back plate 32 as shown in FIG. 5 to lock the back plate 32 of the casing 30 on the mounting plate 20, so that the back plate 32 of the casing 30 is rested on the front face 21 of the mounting plate 20 rigidly and stably as shown in FIGS. 2 and 7. In addition, the torsion spring 4 is compressed and distorted during movement of the casing 30 to store a restoring force.

Figure 6:
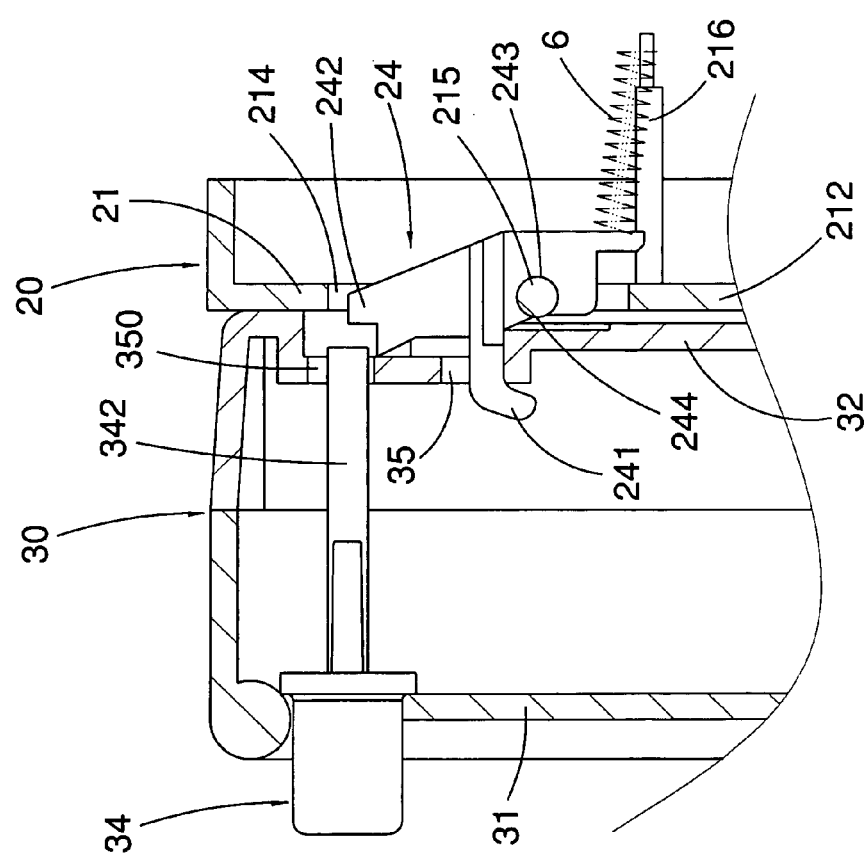
FIG. 6 is a schematic operational view of the multi-media player as shown in FIG. 5.

Referring to FIGS. 1, 2, 6 and 8, when the first push button 34 is pressed inward, the drive bar 342 is moved to press and move the operation portion 242 of the hook member 24 to pivot the hook member 24 which moves the snapping hook 241 outward, so that the snapping hook 241 of the hook member 24 is detached from the snapping hole 35 of the back plate 32 as shown in FIG. 6. At this time, the casing 30 is moved outward relative to the mounting plate 20 by the restoring force of the torsion spring 4 to move to the second position, so that the back plate 32 of the casing 30 is removed from the front face 21 of the mounting plate 20 to wholly expose the window 211 as shown in FIGS. 1 and 8. In addition, the tensile spring 6 is lengthened during movement of the hook member 24 to store a restoring force. In addition, the first gear 23 and the second gear 33 provide a reduction effect to prevent a violent collision.

As shown in FIG. 1, a second push button 7 is movably mounted on the back plate 32 of the casing 30 to control operation of the receiving portion 10 of the main frame 1.

Accordingly, by provision of the hook member 24, the back plate 32 of the casing 30 is mechanically rested on the front face 21 of the mounting plate 20 when the casing 30 is disposed at the first position as shown in FIG. 2.

Alternatively, the back plate 32 of the casing 30 is provided with a magnetic strip, and the mounting plate 20 is made of magnetic material, so that the back plate 32 of the casing 30 is magnetically rested on the front face 21 of the mounting plate 20 when the casing 30 is disposed at the first position as shown in FIG. 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A multi-media player, comprising:
   a main frame; and
   a rotatable panel rotatably mounted on the main frame and including:
      a mounting plate secured on the main frame and formed with a window, the mounting plate having a front face; and
      a casing rotatably mounted on the mounting plate and including a front plate and a back plate combined with each other, wherein:
         the casing is rotatable between a first position where the back plate of the casing is rested on the front face of the mounting plate and a second position where the back plate of the casing is removed from the front face of the mounting plate to expose the window;
         the front plate of the casing is provided with an indicator to indicate an operation condition of the multi-media player and a plurality of control switches to control an operation of the multi-media player; and
         the back plate of the casing is formed with a snapping hole, the front face of the mounting plate is formed with a slot, and the casing further includes a hook member pivotally mounted in the slot of the mounting plate and movable into the snapping hole of the back plate to lock the back plate of the casing.

2. The multi-media player in accordance with claim 1, wherein the casing further includes a shaft mounted in the slot of the mounting plate, and the hook member is pivotally mounted on the shaft.

3. The multi-media player in accordance with claim 2, wherein the hook member has an inside formed with a shaft hole pivotally mounted on the shaft, and the shaft hole of the hook member has a side formed with an opening to facilitate insertion of the shaft into the shaft hole of the hook member.

4. The multi-media player in accordance with claim 1, wherein the hook member is provided with a snapping hook that is insertable into the snapping hole of the back plate to lock the back plate of the casing on the mounting plate.

5. The multi-media player in accordance with claim 1, wherein the back plate of the casing is formed with a passage hole, the hook member has a first end formed with an operation portion, and the casing further includes a first push button movably mounted on the front plate of the casing and including a main body protruded outward from the front plate of the casing, a drive bar having a first end mounted on the main body and a second end extended through the passage hole of the back plate and rested on the operation portion of the hook member to pivot the hook member.

6. The multi-media player in accordance with claim 5, wherein the first push button further includes a compression spring mounted between the main body and the back plate of the casing.

7. The multi-media player in accordance with claim 5, wherein the casing further includes a fixing rod mounted on and protruded outward from a back face of the mounting plate, and a tensile spring mounted between the hook member and the mounting plate and having a first end secured on a second end of the hook member and a second end secured on the fixing rod.

8. A multi-media player, comprising:
a main frame; and
a rotatable panel rotatably mounted on the main frame and including:
  a mounting plate secured on the main frame and formed with a window, the mounting plate having a front face; and
  a casing rotatably mounted on the mounting plate and including a front plate and a back plate combined with each other, wherein:
    the casing is rotatable between a first position where the back plate of the casing is rested on the front face of the mounting plate and a second position where the back plate of the casing is removed from the front face of the mounting plate to expose the window;
    the front plate of the casing is provided with an indicator to indicate an operation condition of the multi-media player and a plurality of control switches to control an operation of the multi-media player; and
    the mounting plate has a back face, the back face of the mounting plate has a side provided with two opposite combination portions for mounting a first crank arm and a second crank arm, the first crank arm has an extension extended into the casing for rotatably mounting the casing, and the second crank arm has an extension extended into the casing for rotatably mounting the casing.

9. The multi-media player in accordance with claim 8, wherein the casing further includes a first gear rotatably mounted on the extension of the first crank arm, and a second gear secured on the front plate and meshing with the first gear.

10. The multi-media player in accordance with claim 8, wherein the casing further includes a torsion spring pivotally mounted on the extension of the second crank arm and having a first end secured on the extension of the second crank arm and a second end secured on the casing.

* * * * *